(No Model.)
S. M. HAMBLIN
LEVER SCREW FOR SPINNING FRAMES.
No. 588,273. Patented Aug. 17, 1897.
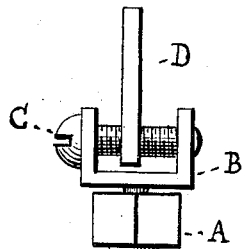
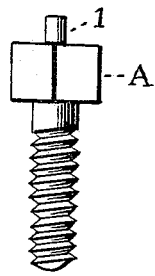
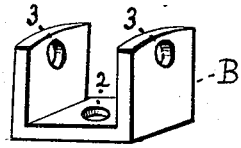
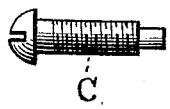
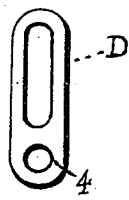
WITNESSES
S. A. Dudley
A. Stead
INVENTOR
Stephen M. Hamblin

UNITED STATES PATENT OFFICE.

STEPHEN M. HAMBLIN, OF TAUNTON, MASSACHUSETTS, ASSIGNOR TO THE MASON MACHINE WORKS, OF SAME PLACE.

LEVER-SCREW FOR SPINNING-FRAMES.

SPECIFICATION forming part of Letters Patent No. 588,273, dated August 17, 1897.

Application filed December 4, 1896. Serial No. 614,500. (No model.)

*To all whom it may concern:*

Be it known that I, STEPHEN M. HAMBLIN, of Taunton, in the county of Bristol and State of Massachusetts, have invented a new and useful Improvement in Lever or Fulcrum Screws for Spinning-Frames, which improvement is fully set forth and described in the following specification, reference being had to the accompanying drawings.

My invention relates to that part of a spinning-frame known as the "top" rolls, the object being to obtain a perfect adjustment of the lever connecting the weight with said rolls. I attain this object by the device hereinafter shown and described.

Figure 1 is a constructive view of my invention. Fig. 2 is a view of the supporting-screw. Fig. 3 is a view of the stand. Fig. 4 is a view of the adjusting-screw, and Fig. 5 is a view of loop.

The screw A is provided with projection 1 at its head to be inserted through hole 2 in stand B, said projection to be riveted or in any manner secured to the stand B, so as to form a swivel if secured loosely. The stand B is also provided with holes 3 3. The adjusting-screw C is passed through one of the holes 3 in stand B, then screwed into and through the hole 4 in loop D, thence through the remaining hole 3 in stand B, the end of screw C to be riveted or in like manner secured to stand B.

Thus it can be seen that by turning the screw A to the right or left it can be adjusted up or down, as desired, and that by turning the adjusting-screw C in like manner it will cause the loop D to traverse in any desired direction between the arms of stand B, thereby providing an adjustment for lever, so that the stirrup can be made to clear the rolls when said rolls are changed.

I claim as my invention and desire to secure by Letters Patent—

The combination in a lever-screw, of loop, D, and screw, C, with stand B and supporting-screw A, the supporting-screw A being attached to stand B, so as to form a swivel, the stand B provided with holes 3, 3, for the purpose of retaining screw C, the screw C being for the purpose of imparting a lateral adjustment to loop, D, substantially as shown and described.

STEPHEN M. HAMBLIN.

Witnesses:
NELLIE B. LEONARD,
LILLA E. SNOW.